United States Patent [19]

Lesquir

[11] Patent Number: 4,887,387

[45] Date of Patent: Dec. 19, 1989

[54] DEVICE FOR COLLECTING SAP

[75] Inventor: Dominique Lesquir, Buckland, Canada

[73] Assignee: IPL Inc., Quebec, Canada

[21] Appl. No.: 350,894

[22] Filed: May 12, 1989

[51] Int. Cl.⁴ ............................................. A01G 23/00
[52] U.S. Cl. ...................................................... 47/52
[58] Field of Search ........................ 47/50, 51, 52, 53; 251/148, 149.9; 222/531, 533, 534, 536

[56] References Cited

U.S. PATENT DOCUMENTS

| | | | |
|---|---|---|---|
| 1,500,347 | 7/1924 | Stubbers | 222/536 X |
| 2,727,658 | 12/1955 | Mart | 222/536 |
| 2,825,182 | 3/1958 | Ayres | 47/52 |
| 4,512,104 | 4/1985 | Lamb | 47/52 |
| 4,674,661 | 6/1987 | Herold | 222/533 X |

Primary Examiner—David A. Scherbel
Assistant Examiner—Jerrold D. Johnson
Attorney, Agent, or Firm—Cushman, Darby & Cushman

[57] ABSTRACT

The disclosure herein describes a device for collecting sap from trees which comprises: a first member having a hollow sap-collecting section with one end adapted to be inserted into a cavity formed in the outer layers of a tree to be sapped, and an openable housing section integrally formed at the other end thereof; and a second member with a head section movably mounted in the housing section and a sap-discharging section adapted to be connected to a sap tubing system. The head section is movable between a first position wherein a channel in the head section is in fluid communication with the sap passageway so that sap collected from the tree may be directed to the sap tubing system through the channel, and a second position wherein the passageway is blocked by the head section. A third member partially mounted over the sap-collecting section of the first member may be used to cooperate with an expansible sealing element on the first member to sealingly secure the device into the tree.

12 Claims, 2 Drawing Sheets

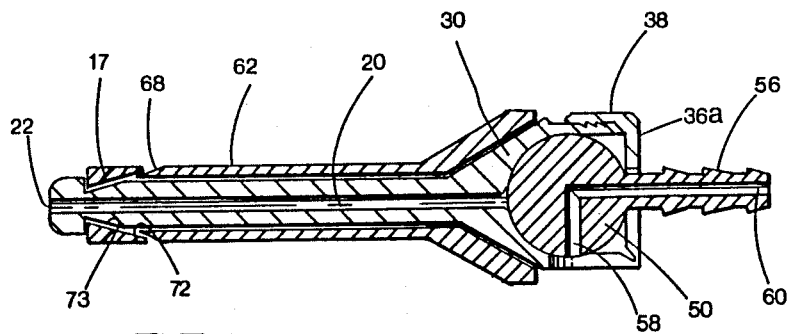
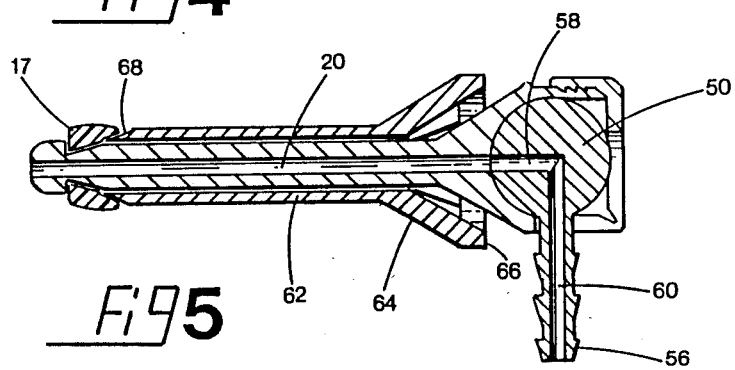
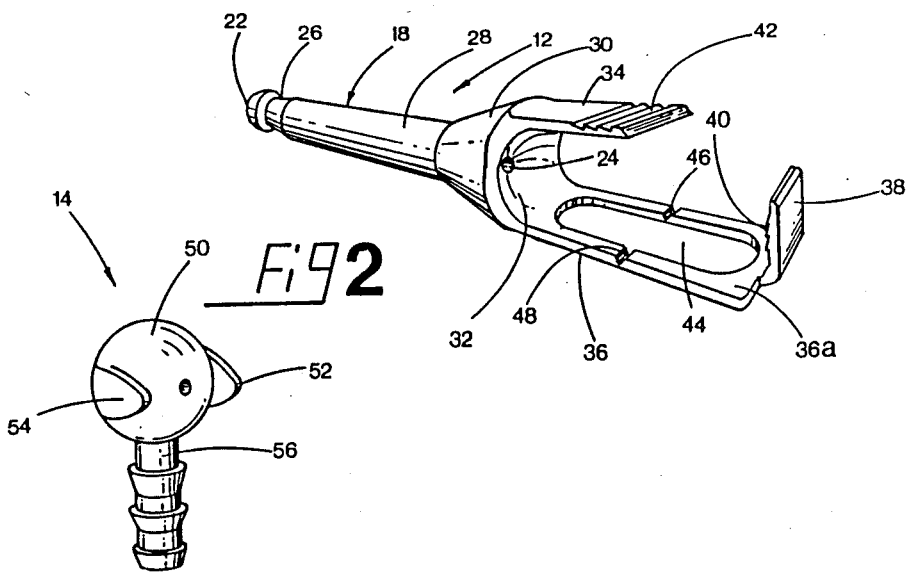

DEVICE FOR COLLECTING SAP

FIELD OF THE INVENTION

The present invention relates to a device for collecting sap from trees.

BACKGROUND OF THE INVENTION

Recent tree sap-collecting systems consist of a network of interconnected tubings allowing the sap collected from trees to be vacuum-sucked directly to a central sap-processing unit. In applicant's Canadian co-pending application No. 561,977 filed Mar. 21, 1988, there is described a device for collecting sap from trees that includes a member having a hollow sap-collecting section integral with a hollow sap-discharging section. The sap-collecting section has an open end which is inserted into a cavity formed in the outer layers of a tree to be sap-collected. The sap-collecting section displays thereon an annular recess in which is received expansible means to provide a sealing engagement with the tree layers and to prevent air infiltration in the first member when the sap-collecting system to which the sap-collecting device is connected is operated under vacuum conditions. A sleeve partially surrounds the sap-collecting section of the member and cooperates therewith to force the sealing means to expand to thereby secure the device in the tree cavity.

In cases where the sap-collecting system is not in operation or the device not connected to the sap-collecting tubing, a cap is required to close off the exit of the sap-discharging section.

OBJECTS AND STATEMENT OF THE INVENTION

The present invention is concerned with providing a sap-collecting device which can be moved in and out of sap-collecting operation thus avoiding the use of the cap.

This is achieved by providing a two-member sap-collecting device with one member being movable relative to the other to adopt a sap-collecting position or a sap-blocking position.

The present invention therefore relates to a device for collecting sap from trees which comprises:

a first member having a hollow sap-collecting section having one end adapted to be inserted to a cavity formed in the outer layers of a tree to be sapped and an openable housing section integrally formed at the other end thereof; the sap-collecting section defines a sap passageway having one end opening in the cavity and an opposite end opening in the housing section; and a second member having a head section movably mounted in the housing section and a sap-discharging section adapted to be connected to a sap tubing system; the second member has communicating channel means in the head section and in the sap-discharging section; the head section being movable between a first position wherein the channel means of the head section is in fluid communication with the sap passageway of the sap-collecting section so that sap collected from the tree may be directed to the sap tubing system through the channel means, and a second position wherein the passageway is blocked by the head section at the said one end.

In a preferred embodiment of the invention, the said one end of the sap-collecting section displays thereon an annular recess which is disposed in the tree cavity; expansible means are provided in this recess to provide a sealing engagement with the tree layers to prevent air infiltration in the passageway. A third member is thus used which partially surrounds the sap-collecting section of the first member. The first and the third members cooperate together to force the sealing means to expand thereby sealingly securing the device in the tree cavity.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 2 is a perspective view of a first member of the sap-collecting device shown in FIG. 1;

FIG. 3 is a perspective view of a second member of the sap-collecting device shown in FIG. 1;

FIG. 4 is a cross-sectional view of the sap-collecting device shown in the fluid blocking position;

FIG. 5 is a cross-sectional view of the sap-collecting device shown in the fluid communicating position;

DESCRIPTION OF PREFERRED EMBODIMENTS

Figure 1:
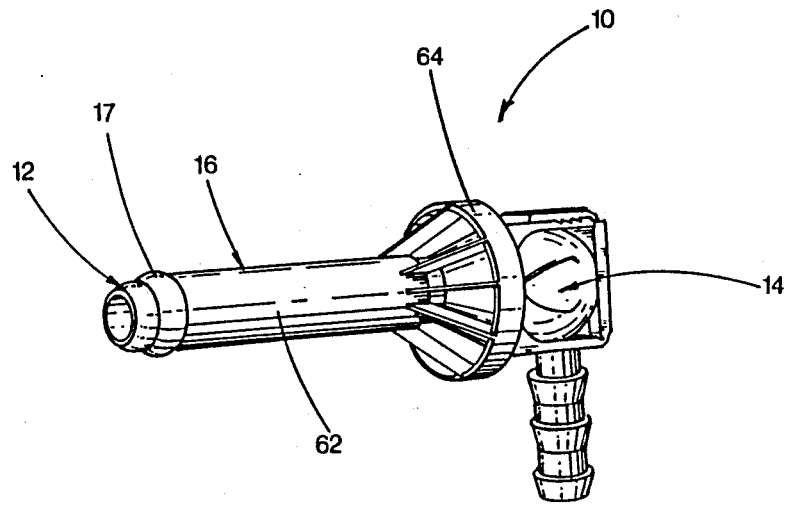
FIG. 1 is a perspective view of one preferred embodiment of a sap-collecting device made in accordance with the present invention.

Referring to FIG. 1, there is shown a device, generally denoted 10, for collecting sap from trees and for directing the sap to a sap-collecting system (not shown) which operates under vacuum systems through tubings and other connections.

The device comprises essentially two members 12 and 14 with preferably a third member 16 and a sealing member 17.

Referring to FIG. 2, the first member 12 comprises a hollow elongate cylindrical sap-collecting section 18 having a central passageway 20 with opposite ends 22 and 24. Adjacent end 22 is an annular recess 26 having a frusto-conical shape. The sap-collecting section 18 is formed of a cylindrical portion 28 and a frusto-conical portion 30 which has a semi-spherical recess 32 and two opposite rectangular portions 34 and 36 projecting outwardly from the recess 32. Portion 36 displays a tong 38 with a toothed portion 40 adapted to be engaged with the toothed portion 42 of projection 34. Also, portion 36 displays an elongated slot 44 and a pair of opposite V-shaped grooves 46 and 48 of reduced thickness thereby allowing portion 36a to be folded so that toothed portions 40 and 42 may be engaged, thus defining a housing which may be opened or closed to receive the second member.

Referring to FIG. 3, the second member 14 consists of a spherical head section 50 with a pair of opposite cam surfaces 52 and 54 and a sap-discharging section 56.

This second member has two communicating channels 58 and 60 which extend in the spherical head section 50 and in the sap-discharging section 56.

As can be seen in FIG. 4, when member 14 is in the position shown, there is no fluid communication between the passageway 20 and the channels 58 and 60. In the position illustrated in FIG. 5, the first and second members 12 and 14 are in fluid communication as a result of channel 58 being in line with the passageway 20.

The movement of the sap-discharging section 56 from the position shown in FIG. 4 to the position shown in FIG. 5, is permitted due to slot 44 in the housing section formed of interconnected parts 34 and 36. The rotation is facilitated by the spherical shape 32 of the housing conforming to the spherical shape of the head 50.

Figure 6:
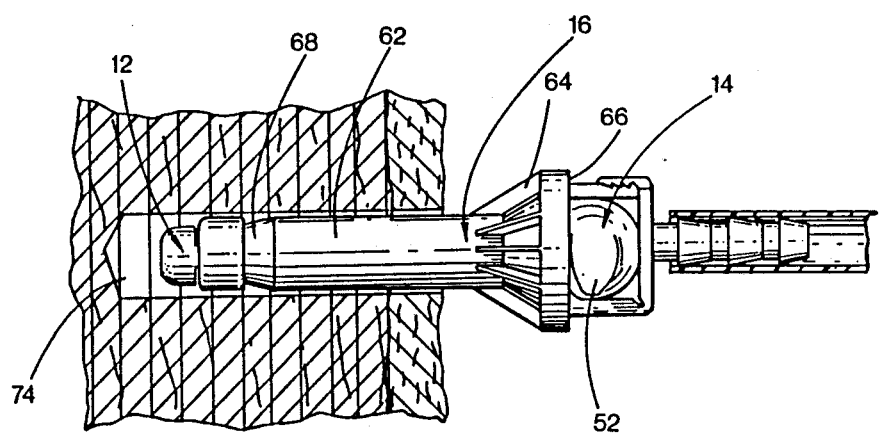
FIG. 6 is an elevational view of the sap-collecting device shown mounted in the sap-blocking position in the outer layers of a tree; the figure is shown on the sheet illustrating FIG. 1.
Figure 7:
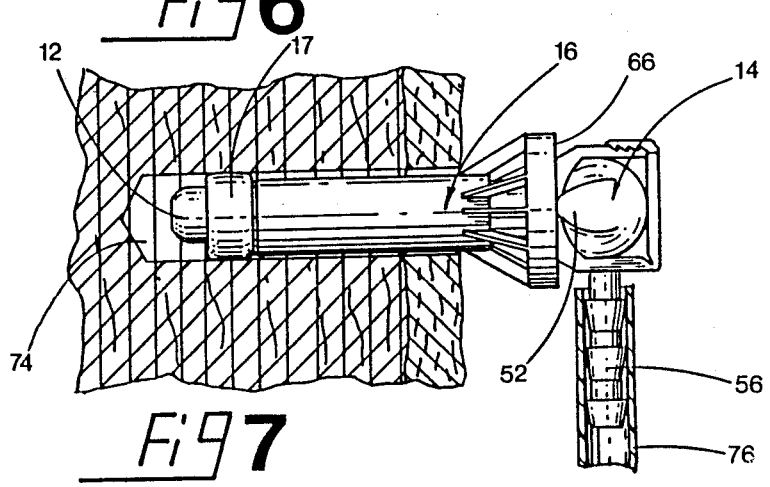
FIG. 7 is an elevational view of the sap-collecting device shown in the sap-collecting position; the figure is shown on the sheet illustrating FIG. 1.

A preferred feature of the present invention is the provision of the third member 16 which partially extends over the first member and, more particularly, the sap-collecting section thereof. As illustrated in FIGS. 1, 6 and 7, member 16 includes a cylindrical sleeve portion 62 and a conical portion 64 with a flat annular surface 66 at one end thereof. The opposite end of the cylindrical portion 62 is tapered at 68 adjacent the recess 26 of the first member.

The sealing element 17 is an expansible rubber band which is fittingly received in the recess and has a bore 72 (see FIG. 4) corresponding substantially to the inclined wall portion 73 of the recess and the tapered end 68 of the cylindrical portion 62.

Referring to FIGS. 4-7, the rotation of the second member 14 from the position shown in FIGS. 4 and 6 to the position shown in FIGS. 5 and 7 causes the cam surface 52 and 54 of the head section 50 to abutt the annular surface 66 of the third member forcing the tapered end 68 to penetrate the bore of the rubber band 17 which expands and seals the cavity 74 practiced in the outer layers of a tree. Hence, when the tubing 76 which is securely mounted to the sap-discharging section 56 of the second member is part of a sap-collecting system operating under vacuum-sucking conditions to draw sap from the tree to a central processing unit, the sealing element 17 prevents air infiltration in the tubing and in the system by completely blocking the area around the sap-collecting section of the device inside the tree.

Although the invention has been described above in relation to one specific form, it will be evident to the person skilled in the art that it may be refined and modified in various ways. For example, the sap-collecting device would operate just as well without the presence of the third member in cases where the device is not used with a system working under vacuum conditions. It is therefore wished to have it understood that the present invention should not be limited in interpretation, except by the terms of the following claims.

The embodiments of the invention in which an exclusive property or privilege is claimed are defined as follows:

1. A device for collecting sap from trees comprising:
 a first member having a hollow sap-collecting section having one end adapted to be inserted into a cavity formed in outer layers of a tree to be sapped, and an openable housing section integrally formed at the other end thereof; said sap-collecting section defining a sap passageway having one end opening in said cavity and an opposite end opening in said housing section; and
 a second member having a head section movably mounted in said housing section, and a sap-discharging section adapted to be connected to a sap tubing system; said second member having communicating channel means in said head section and in said sap-discharging section; said head section being movable between a first position wherein said channel means of said head section is in fluid communication with said sap passageway of said sap-collecting section so that sap collected from the tree may be directed to the sap tubing system through said channel means, and a second position wherein said passageway is blocked by said head section at said one end.

2. A device as defined in claim 1, wherein said housing section is defined by a pair of opposite sections integrally formed at said other end of said sap-collecting section.

3. A device as defined in claim 2, wherein one of said opposite sections has a longitudinal opening therein to permit allowing passage and movement of said sap-discharging section therein.

4. A device as defined in claim 3, wherein said one of said opposite sections has areas of reduced thickness to allow said openable section to be formed into a housing.

5. A device as defined in claim 4, wherein each said opposite section has interengaging means for securing closure of said housing section.

6. A device as defined in claim 1, wherein said head section has a spherical shape.

7. A device as defined in claim 1, wherein said one end of said sap-collecting section displays thereon an annular recess; said device further comprising expansible sealing means secured in said recess to provide a sealing engagement with tree layers to prevent air infiltration in said passageway when the tubing system operates under vacuum conditions.

8. A device as defined in claim 7, further comprising a third member partially mounted over said sap-collecting section of said first member and having one end disposed adjacent said sealing means; means cooperating between said first member and said third member for causing said third member to force said sealing means to expand to sealingly secure said device in the cavity of a tree.

9. A device as defined in claim 8, wherein said third member is a cylindrical sleeve slidingly mounted over a portion of said sap-collecting section; said sleeve defining an abutting surface at one end thereof; said cooperating means including actuatable means on said head section contacting said surface to slidingly move said sleeve over said sap-collecting section and contact said sealing means.

10. A device as defined in claim 9, wherein said head section has a spherically shaped body and includes a pair of opposite cam surfaces to contact said surface when said second member is moved from said second position to said first position.

11. A device as defined in claim 7, wherein said sealing means is a rubber band.

12. A device as defined in claim 7, wherein said first, second and third members are made of plastics material.

* * * * *